United States Patent
Chen et al.

(10) Patent No.: US 7,436,884 B2
(45) Date of Patent: Oct. 14, 2008

(54) METHOD AND SYSTEM FOR WAVELET PACKET TRANSMISSION USING A BEST BASE ALGORITHM

(75) Inventors: Hal-Wen Chen, Orlando, FL (US); Teresa L. Olson, Winter Garden, FL (US)

(73) Assignee: Lockheed Martin Corporation, Orlando, FL (US)

( * ) Notice: Subject to any disclaimer, the term of this patent is extended or adjusted under 35 U.S.C. 154(b) by 914 days.

(21) Appl. No.: 10/395,255

(22) Filed: Mar. 25, 2003

(65) Prior Publication Data

US 2003/0185247 A1 Oct. 2, 2003

Related U.S. Application Data

(60) Provisional application No. 60/367,282, filed on Mar. 26, 2002.

(51) Int. Cl.
    *H04B 1/66* (2006.01)
(52) U.S. Cl. .................. 375/240; 382/252; 382/253; 375/240.25
(58) Field of Classification Search ............ 375/240, 375/240.25; 382/252, 253
    See application file for complete search history.

(56) References Cited

U.S. PATENT DOCUMENTS

| | | | | |
|---|---|---|---|---|
| 5,111,294 A | * | 5/1992 | Asai et al. | ............ 375/240.12 |
| 5,526,299 A | * | 6/1996 | Coifman et al. | ............ 708/801 |
| 5,534,927 A | * | 7/1996 | Shishikui et al. | ......... 348/400.1 |
| 6,600,786 B1 | * | 7/2003 | Prakash et al. | ......... 375/240.25 |
| 6,820,016 B2 | * | 11/2004 | Brown et al. | .................. 702/51 |
| 6,879,633 B2 | * | 4/2005 | Prakash et al. | ......... 375/240.25 |
| 2004/0062448 A1 | * | 4/2004 | Zeng et al. | .................. 382/251 |

OTHER PUBLICATIONS

Wikipedia, NL (Complexity),see http://en.wikipedia.org/wiki/NL_%28complexity%29, found Jun. 6, 2006 at. www.wikipedia.org.*
Wikipedia, Decision Problem, see http://en.wikipedia.org/wiki/Decision_problem, found Jun. 6, 2006 at. www.wikipedia.org.*

* cited by examiner

*Primary Examiner*—Ted Wang
(74) *Attorney, Agent, or Firm*—Birch, Stewart, Kolasch & Birch, LLP

(57) ABSTRACT

A data compression system and method provides a best base searching method to determine the best orthogonal basis function for wavelet-based, data compression. A processing device may receive data signals from a source and wavelet-based data compression may be performed on the received data before transmission (to a receiving component) and/or further digital signal processing (DSP) of the data signals. An encoder portion of the processing device performs the data compression using a predetermined algorithm that determines the best orthogonal basis function (base) of the signal transform (used for representing the data signals) by searching a set of bases including (approximately) all orthogonal bases available to provide the minimum number of coefficients for efficient data compression while maintaining a low error rate in reconstructing the original data signals.

21 Claims, 8 Drawing Sheets

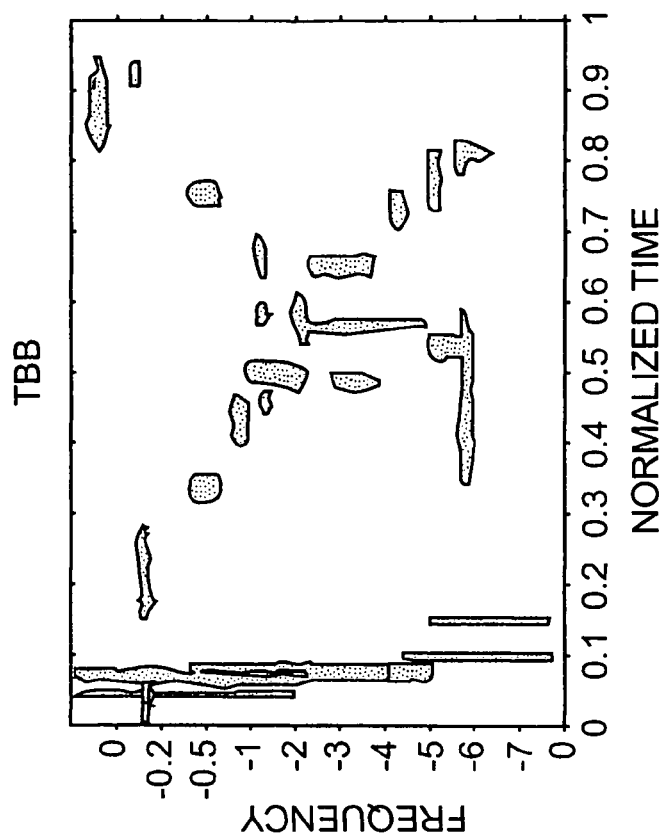
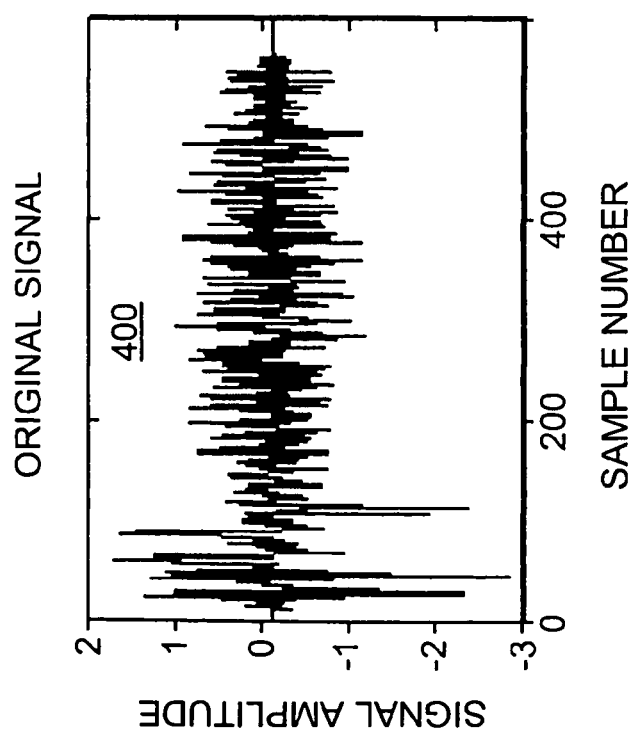
FIG. 4B
FIG. 4A

METHOD AND SYSTEM FOR WAVELET PACKET TRANSMISSION USING A BEST BASE ALGORITHM

CROSS-REFERENCE

This application claims the benefit of U.S. provisional application, Ser. No. 60/367,282, filed Mar. 26, 2002.

TECHNICAL FIELD

The present invention relates generally to data communications and compression. It particularly relates to a data compression technique that uses a best base algorithm for efficient compression of wavelet packets.

BACKGROUND OF THE INVENTION

Data compression is used for a wide variety of applications (e.g., image sensing and processing, wireless/wireline communications, internet communications, etc.) to improve the bandwidth usage, speed, quality, noise reduction, and other parameters of the particular application. A key factor for efficient data compression is reducing the number of coefficients of the basis function for the signal transform used to represent the original data signals where the coefficients are associated (related to) with vectors of the digital signal transform matrix. The coefficients are used to reconstruct (recover) the original data signals and therefore reducing the number of coefficients (needed for signal reconstruction) to a minimum number (top coefficients) leads to a reduction in the digital signal processing (DSP) computational requirements for reconstructing (recover) the original digital signal, and therefore improves the efficiency of the data compression method (technique) while maintaining a reasonably low error rate.

A number of data compression techniques are currently used to improve efficiency (and reduce errors) which use different signal representation transforms wherein examples include Discrete Fourier transform (DFT), Fast Fourier transform (FFT), and wavelet-based transforms (e.g., discrete wavelet transform-DWT). However, the DSP computational complexity using DFTs may be still relatively high as compared to FFTs or wavelet-based transforms. For example, where N is the sample length of an input data signal (e.g., N=512) or size of an input image (e.g., N=65,536 for an input image of size 256×256), the computational complexity for the DFT is $N^2$ (e.g., $N^2 =262,144$ for an input data signal of length 512, or $N^2 32 [65,536]^2$ for an input image of size 256×256). Also, DFTs and FFTs use a sine or cosine function (basis function) which may be less accurate for certain signal representations (e.g., signals with discontinuity) and thus makes wavelet-based transforms (using wavelets—small, localized waves or waveforms) a better data compression choice for many communications systems. Additionally, communications systems using wavelet-based transforms (wavelet modulation) as part of an orthogonal frequency division multiplexing (OFDM) service offering may provide a number of advantages including greater stop-band separation (e.g., more than 40 dB separation as compared to other modulation techniques) leading to greater resistance to noise and interference and more channels, easier equalization, better feature extraction, less need for external filters, and more efficient spectral utilization.

However, although wavelet-based compression offers many advantages over other data compression techniques, there is still a problem for wavelet-based transforms of finding the best, orthogonal basis function (and minimum number of coefficients of the best basis function) of the digital signal transform used to represent the original imaging data signal. For example, DWT only uses a specific basis function (wavelet basis function) out of the large plurality (e.g., thousands) of possible (orthogonal) basis functions available from an associated wavelet packet dictionary.

A commonly-used method for finding the best basis function (base) for wavelet packet applications (e.g., WPD) is the binary-tree best base searching method (BTBB) which is based on wavelet theory that if a orthonormal wavelet filter pair is used, coefficients at the same decomposition level are orthogonal to each other, and also coefficients in a parent node are orthogonal to all the coefficients at one level down except for the coefficients at its children nodes. From this theory, the BTBB method finds the best orthogonal base (basis function) by exclusively selecting base vectors from either a parent node or its directly-related children nodes in the binary-tree structure based on a group cost measurement (e.g., comparing the entropy of the parent node to the entropy of the children nodes).

However, exclusively selecting base vectors from only the parent node or only its children nodes is a limitation on the set of available orthogonal bases since many vectors in the children node may be orthogonal to the vectors in its parent node. Thus, the BTBB method only searches within a limited subset of the set containing all of the orthogonal bases in the associated wavelet packet dictionary.

Therefore, due to the disadvantages of the current best base searching methods for wavelet-based applications, there is a need to provide a method and system which determines the best orthogonal basis function (base) by searching a set of bases including (approximately) all orthogonal bases available to provide the minimum number of coefficients for efficient, wavelet-based image data compression while maintaining a low error rate in reconstructing the original data signals.

SUMMARY OF THE INVENTION

The method and system of the present invention overcome the previously mentioned problems by providing a data compression system that performs a best base searching method to determine the best orthogonal basis function for wavelet-based, data compression. A processing device may receive data (digital) signals from a source and wavelet-based data compression may be performed on the received data before transmission (to a receiving component) and/or further digital signal processing (DSP) of the data signals. An encoder portion of the processing device performs the data compression using a predetermined algorithm that determines the best orthogonal basis function (base) of the digital signal transform (used for compressing the data signals) by searching a set of bases including (approximately) all orthogonal bases available to provide the minimum number of coefficients for efficient data compression while maintaining a low error rate in reconstructing the original data signals.

BRIEF DESCRIPTION OF THE DRAWINGS

FIG. 4a shows a diagram of an exemplary original data signal in accordance with embodiments of the present invention.

FIG. 4b shows a diagram of an exemplary time-frequency image of a best orthogonal basis function in accordance with embodiments of the present invention.

DETAILED DESCRIPTION

Figure 1:
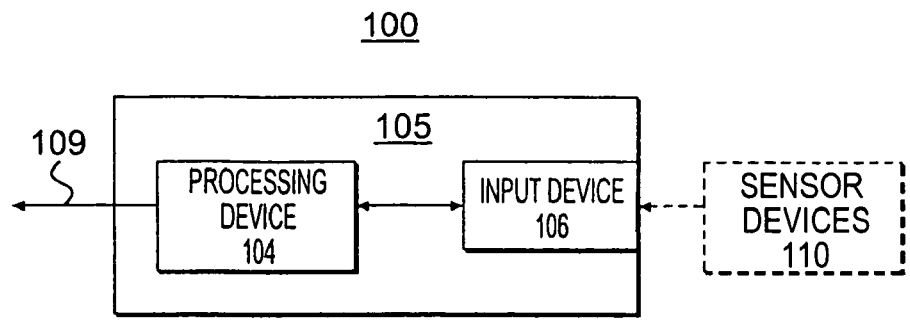
FIG. 1 is a functional block diagram of an exemplary data compression system in accordance with embodiments of the present invention.

FIG. 1 shows a functional block diagram of an exemplary data compression system 100 in accordance with embodiments of the present invention. Advantageously, data compression system 100 may include a controller 105 which includes input device 106 and processing device 104. Optionally, sensor devices 110 (which is indicated in dashed-lines) may be functionally coupled to controller 105 for acquiring data.

In accordance with embodiments of the present invention, processing device 104 may perform data compression on data signals received from input device 106 (acting as a source) using an encoder portion in accordance with a predetermined algorithm (which may be loaded from computer readable storage media—not shown) to produce output signal(s) 109. Output signal 109 may be transmitted to a receiving (supplemental) component (not shown) where further digital signal processing (DSP) of the output signal 109 may be performed. Advantageously, processing device 104 may perform wavelet-based data compression on the received digital data signals using wavelet packet decomposition (WPD—and extension of DWT), to decompose low frequency and high frequency bands of the incoming data signals for each level of decomposition.

Figure 2:
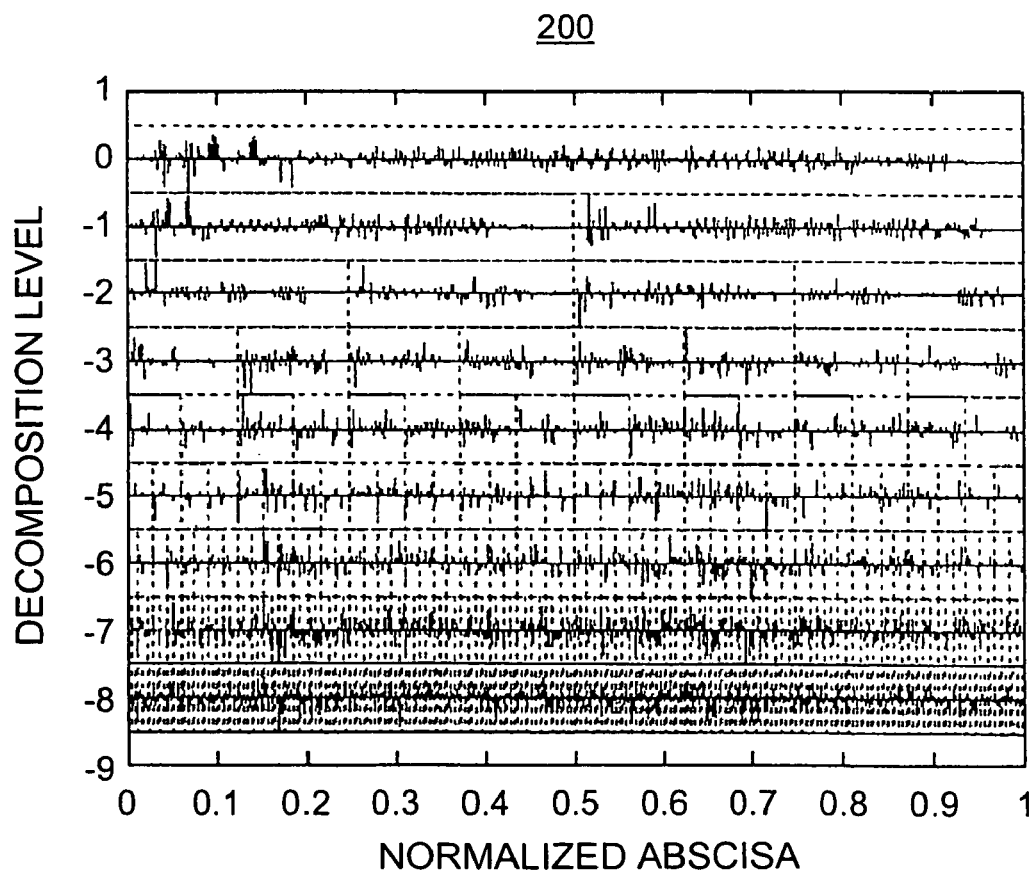
FIG. 2 shows a diagram of an exemplary wavelet decomposition table in accordance with embodiments of the present invention.

FIG. 2 shows an exemplary wavelet packet decomposition table 200 that may be used for data compression of the incoming (imaging data signal in accordance with embodiments of the present invention. The vertical axis of the table 200 displays the decomposition levels where level 0 is the original signal, level-1 is the 1$^{st}$ level down of decomposition, and so on until the last level of decomposition (e.g., level-8) is reached. Exemplary decomposition computation used to form table 200 may be a paired high-pass and low-pass filtering operation (performed on the incoming data signal) followed by a down sampling by a factor of 2. An exemplary wavelet filter (included within processing device 104) used for the filtering operation may include a Daubechies 4-tap (coefficient) filter advantageously arranged as a two-channel filter bank with a pair of orthonormal Quadrature mirror high-pass and low-pass filters. It is noted that the selection of a four-coefficient filter is solely exemplary and should not be viewed as a limitation upon the present invention as filters with alternative numbers of coefficients (e.g., 10) may be selected and be within the scope of the present invention.

During data compression performance by processing device 104, for an exemplary input data signal of sample length N (e.g., 512), the data signal may be decomposed down to a level of -($\log_2 N - 1$) which is level-8 for an exemplary sample length of 512. As shown in Appendix B, the wavelet coefficients (of the basis function) for the different decomposition levels of table 200 may be computed using a matrix form to generate a wavelet packet dictionary containing all the orthogonal vectors (coefficients) in the decomposition orthogonal matrices at different decomposition levels.

Each wavelet coefficient may be generated by calculating the inner-product between the original data signal and a specific vector from the wavelet packet dictionary. Two wavelet coefficients may be defined as being orthogonal to each other if their related vectors are orthogonal to each other (e.g., the inner product of the two vectors is equal to zero). Also, the wavelet coefficients (of the basis function) contained in a frequency band may be defined as a node where the node number at level-j (as shown in Appendix B) is $2^j$, and the node size (the number of coefficients) at level-j may be defined as $d = N/2^j$. Each coefficient at different decomposition levels of table 200 may be related to a specific vector in the wavelet packet dictionary (shown in Appendix B) leading to a total of $P = N*\log_2 N$ different vectors contained in the dictionary.

Processing device 104 may select from a plurality of generated basis functions (bases), including both orthogonal and non-orthogonal bases, in the wavelet packet dictionary based on the relationship that a base used for spanning (representing) a signal with sample length N only requires N vectors (e.g., all possible combinations of N vectors out of $P = N*\log_2 N$ vectors). In accordance with embodiments of the present invention, processing device 104 may only select from the set of orthogonal bases to provide predetermined image compression characteristics (e.g., de-noising, feature extraction, etc.).

Processing device 104 may use a predetermined true best basis (TBB) function search process (algorithm) to determine the best (orthogonal) basis function (and the top vectors of the best basis function) to use for the digital signal transform (e.g., wavelet-based, used to represent the original data signals input from input device 106) in data compression. The TBB process may be based on Theorem 1 and Theorem 2 (including equations (1) and (2)) shown in Appendix A (and proved in Appendix B) which define the orthogonal relationship between vectors in the children and parent nodes for the complete set of orthogonal bases in the wavelet packet dictionary. Based on Theorems 1 and 2, an exemplary wavelet filter (used by processing device 104) with length L (tap number of the filter) may generate only L vectors in the children (or parent) nodes of the wavelet packet dictionary which are non-orthogonal to a specific coefficient (vector) in the parent (or children) nodes. Based on this relationship, processing device 104 may determine all the non-orthogonal coefficients (to aid in determining the best orthogonal vectors of the best base) to a specific coefficient in the table 200 using an up-tree and down-tree searching method.

Figure 3:
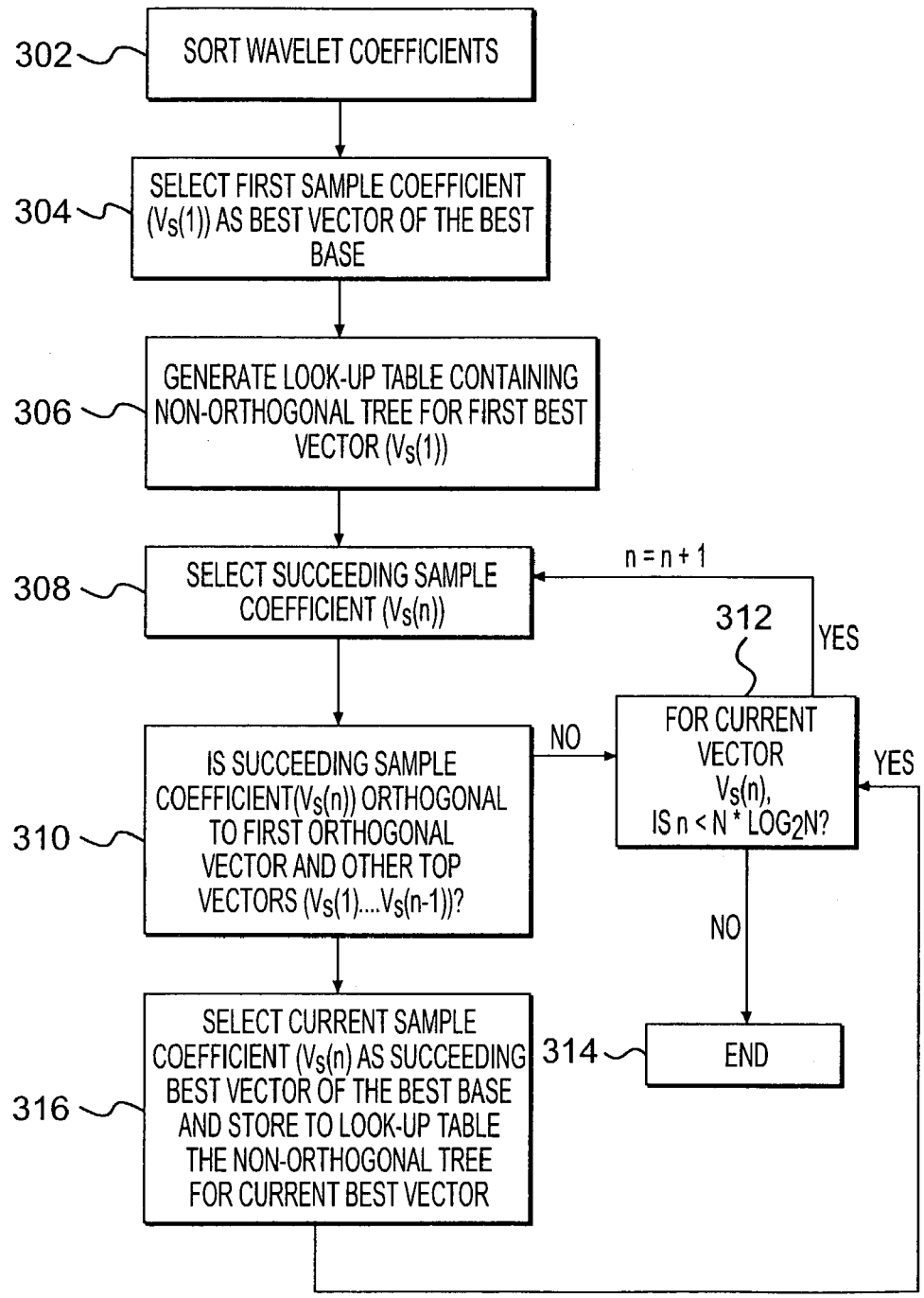
FIG. 3 shows a flowchart of an exemplary best basis function search process in accordance with embodiments of the present invention.

In accordance with embodiments of the present invention, FIG. 3 shows a flowchart of an exemplary best basis (TBB) function search process (algorithm) that is followed by processing device 104. At step 302, all the wavelet coefficients from each decomposition level in table 200 are sorted into a 1-dimensional (1D) vector ($V_s$) with a length of $N*\log_2 N$ (where N equals the sample length for the input signal) in an order of decreasing absolute (magnitude) value (e.g., the first coefficient sample in the sorted vector has the maximum absolute value). Also, during this step, the index of each coefficient at its original decomposition level may be saved to storage media (memory) 108. It is noted that the use of a 1D (signal) vector is solely exemplary and should not be viewed as a limitation upon the scope of the present invention as alternative embodiments of the present invention may include multi-dimensional (e.g., 2D) signal vectors for performing the TBB method.

At step 304, the first (coefficient) sample ($V_s(1)$) in 1-dimensional vector $V_s$ (e.g., $V_s(n)$ for n=1 to $N*\log_2 N$) may be initially (preliminarily) selected as the best (orthogonal) vector of the best base (basis function). Then, at step 306, a non-orthogonal tree which points to and marks all vectors within $V_s$ that are non-orthogonal to $V_s(1)$ may be determined by combining up-tree and down-tree searching methods using equations (1) and (2) where the non-orthogonal tree may be saved to memory 108 as a look-up table.

At step 308, a succeeding (next) coefficient sample $V_s(n)$ (where n >1; e.g., second sample—$V_s(2)$) may be selected and then at step 310, a determination is made whether the selected succeeding sample is orthogonal to $V_s(1)$ and other top orthogonal vectors ($V_s(1) \ldots V_s(n-1)$) based on the look-up table. If the determination is no, then at step 312 a determination is made whether for the current vector, $V_s(n)$, is $n<N*\log 2N$. If no, then the process ends at step 314. If yes, then step 308 is repeated (continued) for further succeeding samples $V_s(n)$ as n is incremented by 1 (e.g., $V_s(3)$, $V_s(4)$, ...).

Also, if the step 310 determination is yes, then the process continues to step 316 where the current sample coefficient $V_s(n)$ (where n>1), being orthogonal to $V_s(1)$, is selected as the succeeding (e.g., $2^{nd}$, $3^{rd}$, $4^{th}$, etc) best vector of the best base, and the non-orthogonal tree which points and marks all vectors within $V_s$ that are non-orthogonal to $V_s(n)$ is determined and stored in the look-up table. Thereafter, the process loops back to step 312 to determine whether the process may continue to find the N top vectors to complete the best base (basis function).

Relying on a test input data signal and computer simulation, use of the predetermined TBB algorithm by processor 104 may produce the exemplary compression performance results of FIGS. 4b, 5-8. FIGS. 4b, 5-8 may have been generated using a (test) synthetic transient signal 400 (shown in FIG. 4a) with a length of 512 samples wherein this original signal is reconstructed using a portion of the top (base) vectors using a plurality of methods including TBB, BTBB, DT (double-tree, not shown), as well as DCT and DWT. Original signal 400 may also include two high frequency transients followed by two lower frequency transient and two Diracs (delta functions) for N<100, as well as two linear chirps that cross each other and which are superimposed with localized sinusoidal waves.

FIG. 4b shows a diagram of an exemplary time-frequency image of a best orthogonal basis function in accordance with embodiments of the present invention. The diagram of FIG. 4b displays the atoms of the best orthogonal base selected using the TBB method described herein where the darkness of a region is proportional to the absolute amplitude of the coefficient.

Figure 5:
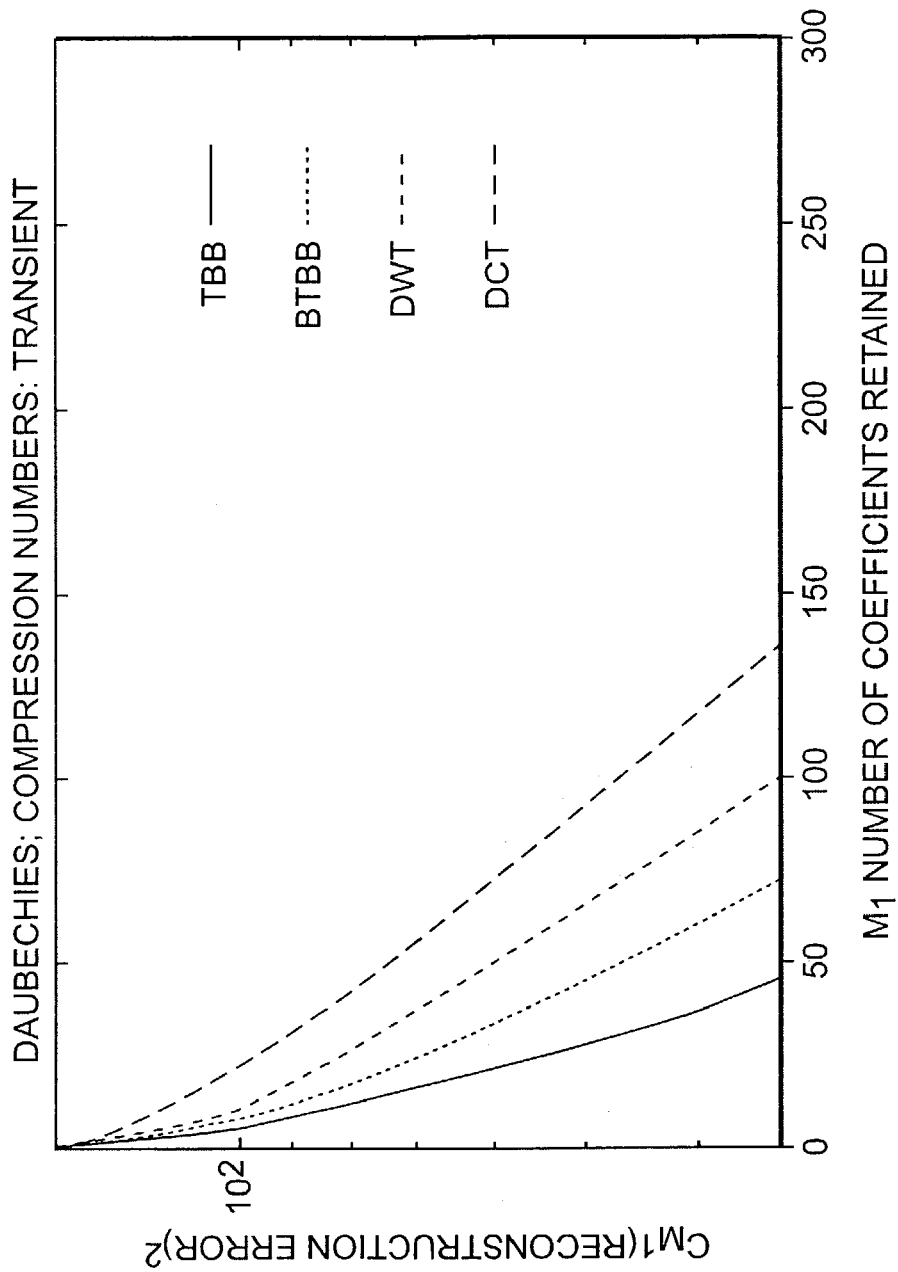
FIG. 5 shows a diagram of exemplary compression performance in accordance with embodiments of the present invention.

FIG. 5 shows a diagram of exemplary compression performance in accordance with embodiments of the present invention. The diagram of FIG. 5 shows a comparison of signal reconstruction results (including reconstruction errors vs. number of coefficients) for the different best base searching methods. As shown in FIG. 5, the TBB method may only require approximately 45 vectors to reconstruct the original signal in comparison to the large top vector numbers required by the other methods.

Figure 6:
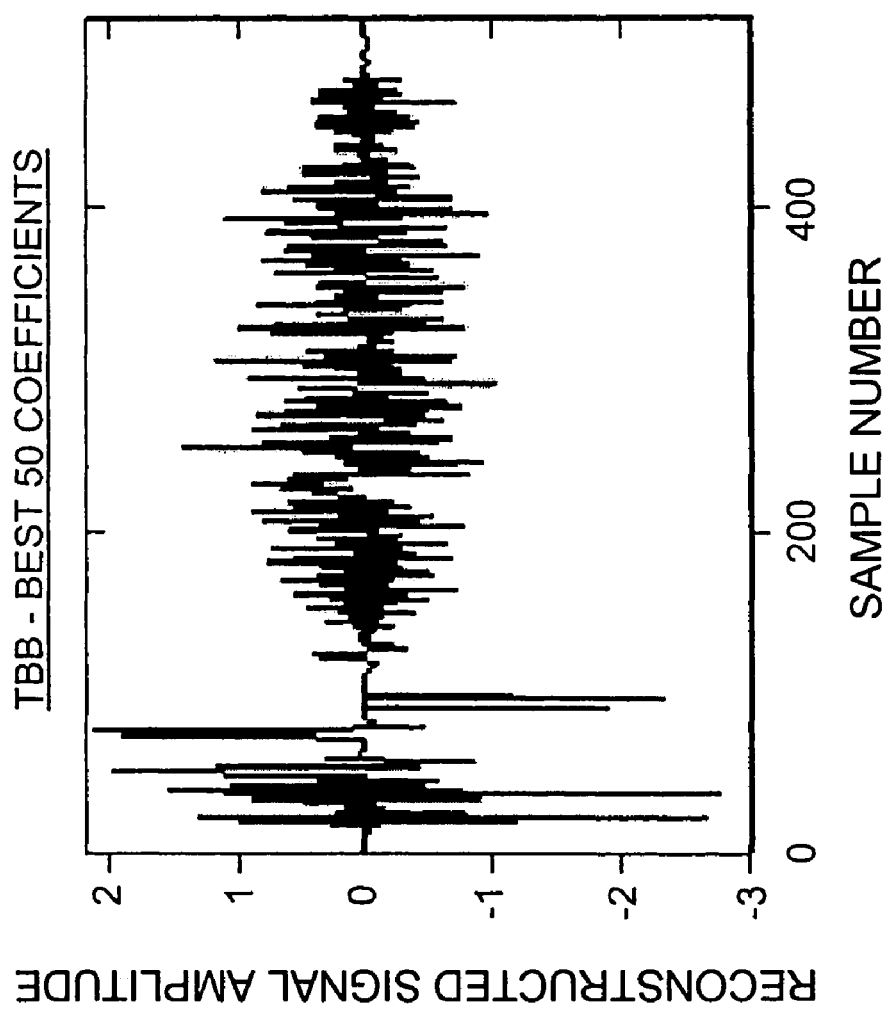
FIG. 6 shows of exemplary signal reconstruction in accordance with embodiments of the present invention.
Figure 7:
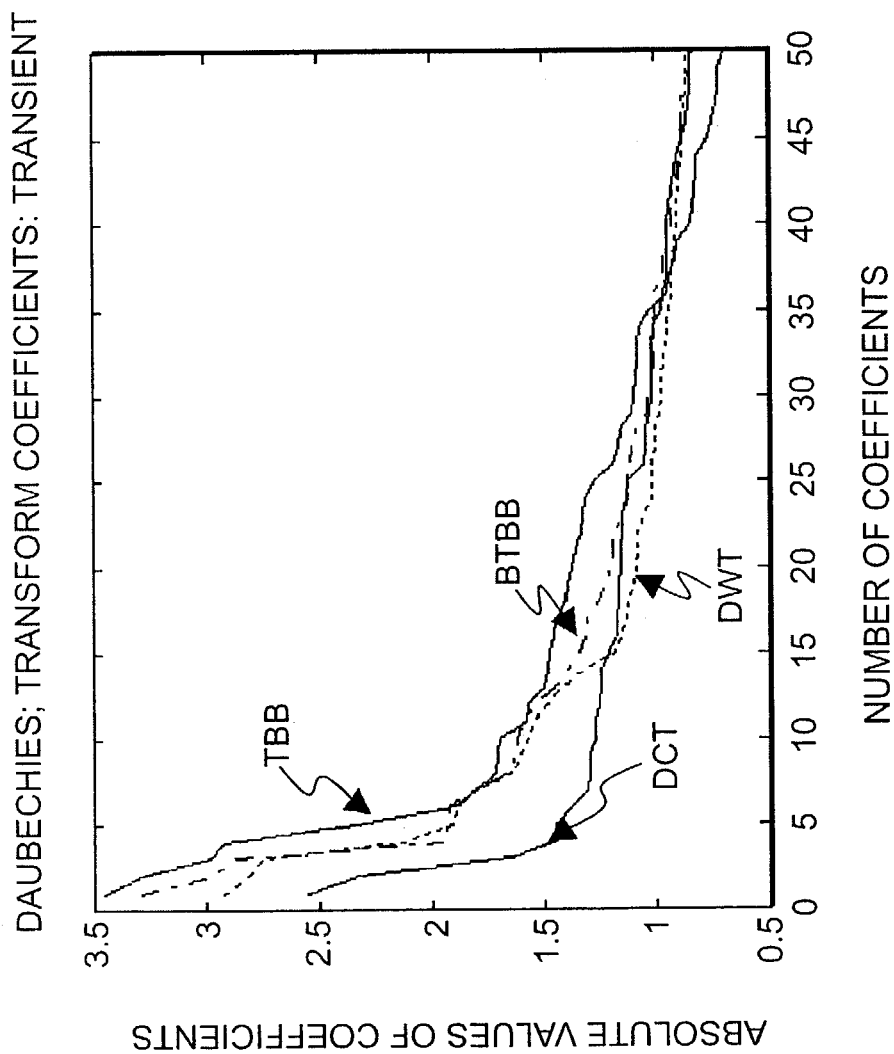
FIG. 7 shows a diagram of exemplary coefficient absolute amplitudes in accordance with embodiments of the present invention

FIG. 6 shows a diagram of exemplary signal reconstruction in accordance with embodiments of the present invention. The diagram of FIG. 6 shows a reconstructed signal (of the original signal shown in FIG. 4a) using the top (best) 50 vectors which produces less errors than other methods (e.g., DCT, DWT, BTBB). Additionally, FIG. 7 shows a diagram comparing the absolute amplitudes of the top 50 coefficients (used to reconstruct the original signal of FIG. 4a), respectively, in accordance with embodiments of the present invention. As shown in FIG. 7, among the plurality of best base searching methods, the TBB method selects the best top feature vector.

Figure 8A:
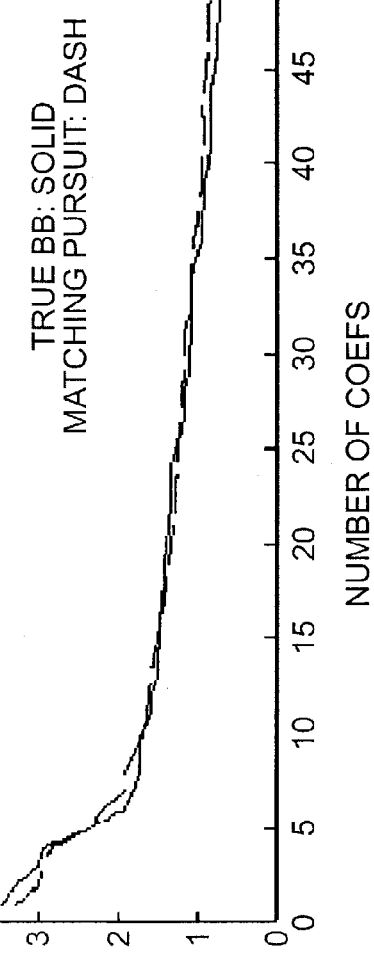
FIG. 8 shows diagrams of exemplary coefficient amplitudes in accordance with embodiments of the present invention.
Figure 8B:
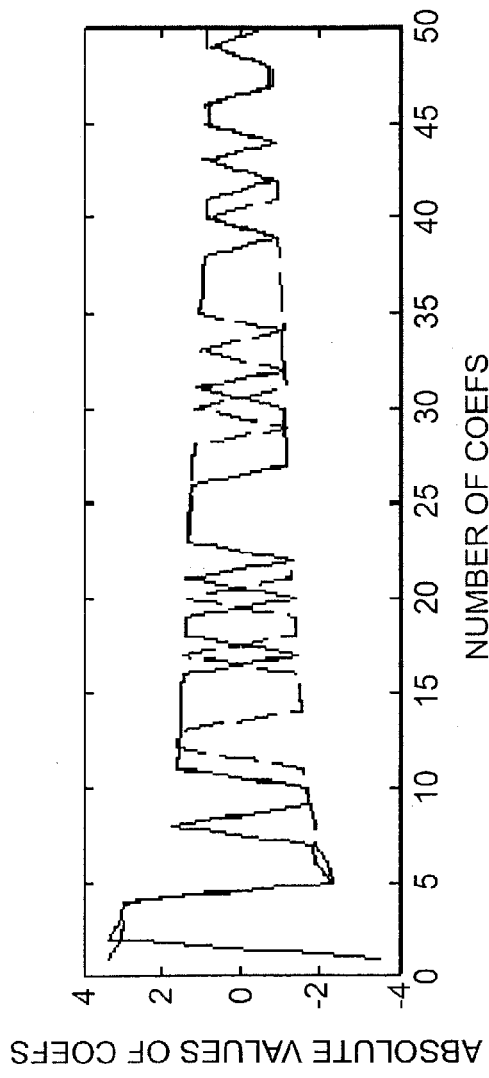
Figures 9A, 9B:
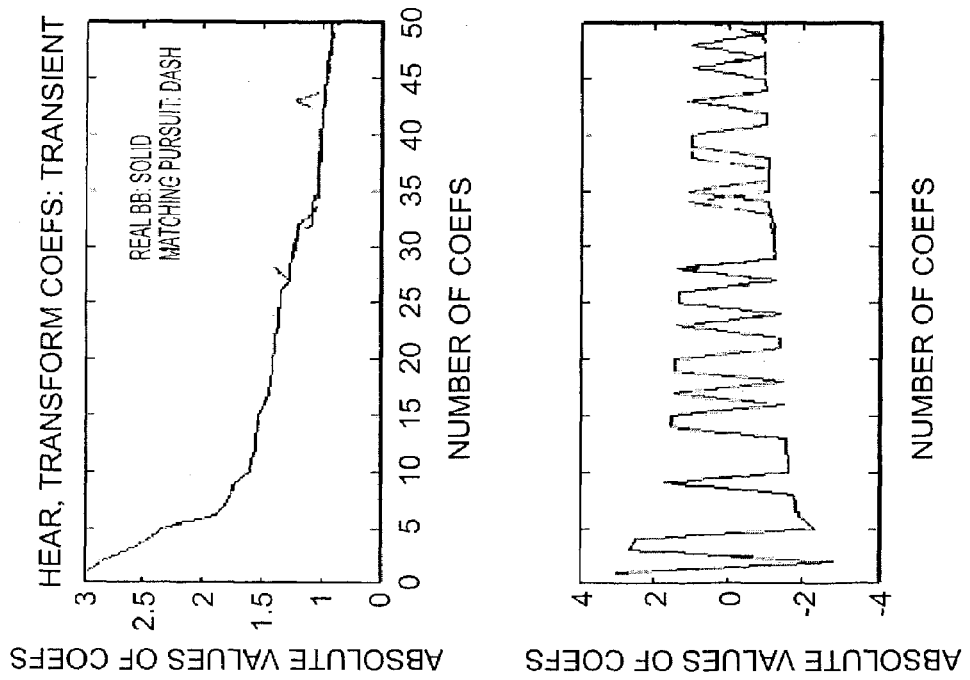
FIG. 9 shows alternative diagrams of exemplary coefficient amplitudes in accordance with embodiments of the present invention.

Also, as shown in FIGS. 8, 9, the TBB algorithm (solid line) performs well in comparison to a matching pursuit algorithm (dashed line) that decomposes any signal into a linear expansion of waveforms or vectors selected from a redundant dictionary (e.g., wavelet packet). FIGS. 8, 9 show the absolute (FIG. 8a, 9a) and regular (FIG. 8b, 9b) amplitudes of the top 50 coefficients from the reconstruction bases (basis functions) estimated by the TBB and matching pursuit methods using either an exemplary Daubechies 4-tap filter (FIG. 8) or exemplary Harr two-tap filter (FIG. 9).

A plurality of further advantages may be provided in accordance with embodiments of the present invention including a best base searching method that uses (determines) a smaller number of vectors to reconstruct an original data signal for the same reconstruction error resulting in improved computing speed (reduced complexity), more efficient data signal compression (reduced number of top vectors), feature extraction, and de-noising. Regarding computing speed, the computing complexity for the TBB method is reduced to $N*(\log_2 N)^2$ which makes the computing speed for TBB faster than other base searching methods (e.g., $N^2*\log_2 N$ and $N^3$ for matching pursuit methods). Also, embodiments of the present invention may be used in a plurality of applications including tracking and video surveillance and other applications using signal/image processing that may require compression, feature extraction, de-noising, object classification, or other performance requirements. Additionally, embodiments of the present invention may serve as good candidates for future implementation of image compression standards such as JPEG and MPEG (Joint Photographic Experts Group, Moving Picture Experts Group).

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

Appendix A

Theorem 1

For a wavelet filter with a length of L (the tap number of the filter), there are only L vectors in the parent node which are non-orthogonal to a specific coefficient (vector) in the two children nodes. The relationship may be expressed as:

$$y(i)=2x-2+i, \quad (1)$$

where x is the location of a specific coefficient (vector) in the children nodes, y(i) is the location of the non-orthogonal coefficient (vector) in the parent node, and i=1, 2, . . . L.

Theorem 2

For a wavelet filter with a length of L (the tap number of the filter), there are only L vectors in the two children nodes which are non-orthogonal to a specific coefficient (vector) in the parent node. The relationship may be expressed as:

$$y(2i-1)=\text{Floor}[(x-1)/2]+i-1,$$

$$y(2i)=\text{Floor}[(x-1)/2]+i-1, \quad (2)$$

where x is the location of a specific coefficient (vector) in the parent node, y(2i−1) and y(2i) are, respectively, is the location of the non-orthogonal coefficient (vector) in the two children nodes, and i=1, 2, . . . L/2.

Appendix B

A Matrix Form of WPD Method and the Proof of Theorems 1 and 2

Before proving Theorems 1 and 2 of Appendix A, WPD (wavelet packet decomposition—an extension of DWT) using the matrix form is described herein. WPD is described using an exemplary wavelet filter such as a Daubechies 4-tap (coefficient) filter (e.g., $C_0, \ldots, C_3$). It is noted that the selection of a four-coefficient filter is solely exemplary and should not be viewed as a limitation upon the present invention as filters with alternative numbers of coefficients (e.g., 10—$C_0, \ldots, C_9$) may be selected and be within the scope of the present invention.

Similar to the DWT method, instead of directly convolving the original signal by dual-band QM (quadrature mirror) filters, the wavelet packet coefficients at each decomposition level of WPD may be calculated by multiplying the signal with a decomposition orthogonal (DO) matrix that is calculated by the multiplication of a number of operating matrices (the operating matrix is defined below) at different decomposition levels. All the orthogonal vectors in the DO matrices at different decomposition levels make up the wavelet packet dictionary. Suppose that the Daubechies 4 filter is used and the signal length is n, then the n×n operating matrix for the $1^{st}$ level decomposition (the level-1 in FIG. 1) is defined in matrix $A^{[1]}$ in equation (3) below:

$$A^{[1]} = \begin{pmatrix} c_0 & c_1 & c_2 & c_3 & & & & & \\ & & c_0 & c_1 & c_2 & c_3 & & & \\ \vdots & \vdots & & & \cdots & & & & \\ \vdots & \vdots & & & & \cdots & & & \\ & & & & c_0 & c_1 & c_2 & c_3 & \\ c_2 & c_3 & & & & & & c_0 & c_1 \\ c_3 & -c_2 & c_1 & -c_0 & & & & & \\ & & c_3 & -c_2 & c_1 & -c_0 & & & \\ \vdots & \vdots & & & \cdots & & & & \\ \vdots & \vdots & & & & c_3 & -c_2 & c_1 & -c_0 \\ c_1 & c_0 & & & & & & c_3 & -c_2 \end{pmatrix} \quad (3)$$

Where $C_0=0.483$, $C_1=0.8365$, $C_2=0.2241$, and $C_3=-0.1294$

For matrix $A^{[1]}$, the low-pass filter and high-pass filter are separated into the top half and bottom half of the matrix. With this arrangement, a permutation operation at a later computing stage may be eliminated. For the $1^{st}$ level decomposition, the DO matrix is also the operating matrix which makes the wavelet packet coefficients at the $1^{st}$ decomposition level obtainable by multiplying the signal vector with matrix $A^{[1]}$ (where the signal vector is a column vector at the right side of the matrix).

The operating matrix for the $2^{nd}$ level decomposition may be defined as:

$$A^{[2]} = \begin{pmatrix} A^{[1]}_{1/2} & 0 \\ 0 & A^{[1]}_{1/2} \end{pmatrix} \quad (4)$$

Where sub-matrix $A^{[1]}_{1/2}$ has the same structure as $A_{[1]}$, but its row and column sizes are only half of those in A[1]. From this relationship, the size of $A^{[1]}_{1/2}$ is n/2×n/2, and the size $A^{[2]}$ is n×n. The DO matrix $C^{[2]}$ for the $2^{nd}$ level decomposition is the multiplication of the operating matrices from the $1^{st}$ and $2^{nd}$ decomposition levels, e.g., $$C^{[2]}=A^{[2]}A^{[1]}=A^{[2]}C^{[1]} \quad (5)$$

Similarly, the operating matrix for the mth [where m=1,2, . . . $\log_2(n-1)$] level decomposition may be defined as:

$$A^{[m]} = \begin{pmatrix} A^{[1]}_{1/(2m-1)} & & & & 0 \\ & A^{[1]}_{1/(2m-1)} & & & \\ & & \cdots & & \\ & & & A^{[1]}_{1/(2m-1)} & \\ 0 & & & & A^{[1]}_{1/(2m-1)} \end{pmatrix} \quad (6)$$

where the sub-matrix $A^{[1]}_{1/(2^{(m-1)})}$ the same structure as $A^{[1]}$, but its row and column sizes are only 1/(2m−1) of those in $A^{[1]}$. From this relationship, the size of $A^{[1]}_{1/(2m-1)}$ is $n/(2^{m-1}) \times n/(2^{m-1})$, and the size A[m] is n×n. The number of the on-diagonal sub-matrices $A^{[1]}_{1/(2m-1)}$ in $A^{[m]}$ is $2^{m-1}$, and each of them relates to a parent node from the last decomposition level. Thus, if a selection process wants to pass and choose a parent node instead of the children nodes, the corresponding sub-matrix may be substituted with an on-diagonal unit sub-matrix (e.g., all of the on-diagonal elements have value 1 and all off-diagonal values are zeros).

The DO matrix $C^{[m]}$ for the mth level decomposition is the multiplication of the operating matrices from all the previous decomposition levels, e.g., $$C^{[m]}=A^{[m]}A^{[m-1]}\ldots A^{[1]}=A^{[m]}C^{[m-1]} \quad (7)$$

After the introduction of WPD method, the Proof of Theorems 1 and 2 may be now described. Since the DO matrix $C^{[m]}$ is an orthogonal matrix, from equation (7) the following relationship may be defined:

$$C^{[m]}_{(i)r}(j)=C^{[m]}_{(j)c}(i)=[A^{[m]}_{(i)r} \cdot C^{[m-1]}_{(j)c}], \quad (8)$$

Where the subscript (i)r and (j)c stand for, respectively, the ith row and jth column, and the brace [ ] indicates the inner-product operation. $C^{[m]}_{(i)r}(j)$ is the jth element in the ith row of C(m).

The orthogonality of the wavelet packet coefficients between two adjacent decomposition levels can be tested by calculating the inner-products of row vectors between two adjacent DO matrices. A zero inner-product indicates an orthogonal relationship while a non-zero inner-product indicates a non-orthogonal relationship. For the mth and (m—1) th levels, by using the relationship in equation (8), then $$d_{il}^{[m-1,m]} = [C_{(i)r}^{[m-1]} * C_{(l)r}^{[m]}] = \sum_{j=1}^{n} C_{(i)r}^{[m-1]} \left[ \sum_{k=}^{n} A_{(l)r}^{[m]}(k) * C_{(l)r}^{[m-1]}(k) \right] = \qquad (9)$$

$$\sum_{k=1}^{n} A_{(l)r}^{[m]}(k) \left[ \sum_{j=1}^{n} C_{(i)r}^{[m-1]}(j) * C_{(j)c}^{[m-1]}(k) \right],$$

where $d_{il}^{[m-1,m]}$ represents the inner-product between the ith row of $C^{[m]}$ and the lth row of $C^{[m-1]}$. Using the relationship:

$$C^{[m-1]}_{(j)c}(k) = C^{[m-1]}_{(k)r}(j),$$

then it may be defined that:

$$d_{il}^{[m-1,m]} = \sum_{k=1}^{n} A_{(l)r}^{[m]}(k) \left[ \sum_{j=1}^{n} C_{(i)r}^{[m-1]}(j) * C_{(k)r}^{[m-1]}(j) \right] = \qquad (10)$$

$$\sum_{k=1}^{n} A_{(l)r}^{[m]}(k) * [C_{(i)r}^{[m-1]} * C_{(k)r}^{[m-1]}]$$

Since the matrix $C^{[m-1]}$ is orthonormal, the inner-product in equation (10) has non-zero outcome only when i=k. For a specific lth coefficient (vector) in level m, its relationship with the ith coefficient in level m−1 will be determined by the value of the ith element in the lth row of $A^{[m]}$. Therefore, the number of non-orthogonal coefficients in level m−1 to the lth coefficient in level m equals the number of non-zero elements in the lth row of $A^{[m]}$. As indicated in equations (3), (4), and (6), the total non-zero elements in a row vector is the number of the filter taps, and thus we obtain the up-tree relationship of equation (1) in Theorem 1 (shown in Appendix A).

Similarly, for a specific ith coefficient (vector) in level m−1, its relationship with the lth coefficient in level m will be determined by the value of the lth element in the ith column of $A^{[m]}$. Therefore, the number of non-orthogonal coefficients in level m to the ith coefficient in level m−1 equals to the number of non-zero elements in the ith column of $A^{[m]}$, and thus we obtain the down-tree relationship of equation (2) in Theorem 2, making both Theorems 1 and 2 proved.

What is claimed is:

1. A method for performing data compression, comprising:
   a) receiving a digital data signal;
   b) determining a true best basis (TBB) function to assign a best basis function for encoding the digital data signal;
   c) transforming digital data signal based on a wavelet-based transform coefficient at various decomposition levels to produce wavelet coefficients;
   d) determining the best basis function based on the wavelet coefficients; and
   e) encoding at least a portion of said received digital data signal using a signal transform said encoding being based on the best basis function satisfying a predetermined threshold.

2. The method of claim 1, wherein said determining the best basis function based on the wavelet coefficients further comprises performing the following steps:
   d1) sorting all wavelet coefficients from each decomposition level into a one dimensional vector, $V_s(n)$ with a length of $N*\log_2(N)$ where N is a sample length of the digital data signal;
   d2) selecting first sample coefficient $V_s(n)$ as a best vector of the best basis function where n is equal to 1;
   d3) generating a look-up-table (LUT) containing a non-orthogonal tree for a first best vector $V_s(1)$;
   d4) selecting $V_s(n+1)$ as a succeeding sample coefficient; and
   d5) determining the best basis function according to an orthogonality of the succeeding sample coefficient.

3. The method of claim 2, wherein said determining the best basis function according to the orthogonality of the succeeding sample coefficient further comprises performing the following steps:
   if the succeeding sample coefficient $V_s(n+1)$ is orthogonal to $V_s(n)$, said determining step iteratively performing the following steps;
      d5-1) selecting the sample coefficient $V_s(n+1)$ as a succeeding best vector of the best basis function and storing to the LUT, the non-orthogonal tree for updated best vector;
      d5-2) if $n < N*\log_2(N)$, iterate steps (g)-(h) and n increment by 1 for each iteration; and
      d5-3) if n is not less than $N*\log_2(N)$, the updated sample succeeding sample coefficient $V_s(n+1)$ is determined as the best basis function.

4. The method of claim 3, wherein said determining the best basis function according to the orthogonality of the succeeding sample coefficient further comprises performing the following steps:
   if the succeeding sample coefficient $V_s(n+1)$ is not orthogonal to $V_s(n)$, said determining step iteratively performing the following steps;
      d5-4) if $n < N*\log_2(N)$, repeat steps (g)-(h) with n increment by 1 for each iteration; and
      d5-5) if n is not less than $N*\log_2(N)$, the current sample succeeding sample coefficient $V_s(n+1)$ is determined as the best basis function.

5. The method of claim 1, wherein said predetermined threshold relates to one of number of errors in, number of coefficients for, amplitude of coefficients for, and computational complexity for reconstructing said at least a portion of the received digital data signal.

6. The method of claim 1, wherein said predetermined threshold relating to a number of coefficients is 50 or less.

7. The method of claim 1, wherein said encoding includes encoding at least a portion of said received data signal using a digital signal transform having a basis function being selected from one of a child and parent node on decomposition levels of said transform.

8. A system for performing data compression, comprising:
   a plurality of sensors for acquiring data; and
   a controller for performing the steps of:
      a) receiving a digital data signal from said plurality of sensors;
      b) determining a true best basis (TBB) function to assign a best basis function for encoding the digital data signal;
      c) transforming digital data signal based on a wavelet-based transform coefficient at various decomposition levels to produce wavelet coefficients;
      d) determining the best basis function based on the wavelet coefficients; and
      e) encoding at least a portion of said received digital data signal using a signal transform said encoding being based on the best basis function satisfying a predetermined threshold.

9. The system of claim 8, wherein said determining the best basis function based on the wavelet coefficients further comprises performing the following steps:
- d1) sorting all wavelet coefficients from each decomposition level into a one dimensional vector, $V_s(n)$ with a length of $N*\log_2(N)$ where N is a sample length of the digital data signal;
- d2) selecting first sample coefficient $V_s(n)$ as a best vector of the best basis function where ii is equal to 1;
- d3) generating a look-up-table (LUT) containing a non-orthogonal tree for a first best vector $V_s(1)$;
- d4) selecting $V_s(n+1)$ as a succeeding sample coefficient; and
- d5) determining the best basis function according to an orthogonality of the succeeding sample coefficient.

10. The system of claim 9, wherein said determining the best basis function according to the orthogonality of the succeeding sample coefficient further comprises performing the following steps:
if the succeeding sample coefficient $V_s(n+1)$ is orthogonal to $V_s(n)$, said determining step iteratively performing the following steps;
- d5-1) selecting the sample coefficient $V_s(n+1)$ as a succeeding best vector of the best basis function and storing to the LUT, the non-orthogonal tree for updated best vector;
- d5-2) if $n<N*\log_2(N)$, iterate steps (g)-(h) and n increment by 1 for each iteration; and
- d5-3) if n is not less than $N*\log_2(N)$, the updated sample succeeding sample coefficient $V_s(n+1)$ is determined as the best basis function.

11. The system of claim 10, wherein said determining the best basis function according to the orthogonality of the succeeding sample coefficient further comprises performing the following steps:
if the succeeding sample coefficient $V_s(n+1)$ is not orthogonal to $V_s(n)$, said determining step iteratively performing the following steps;
- d5-4) if $n<N*\log_2(N)$, repeat steps (g)-(h) with n increment by 1 for each iteration; and
- d5-5) if n is not less than $N*\log_2(N)$, the current sample succeeding sample coefficient $V_s(n+1)$ is determined as the best basis function.

12. The system of claim 8, wherein said predetermined threshold relates to one of number of errors in, number of coefficients for, amplitude of coefficients for, and computational complexity for reconstructing said at least a portion of the received digital data signal.

13. The system of claim 8, wherein said predetermined threshold relating to a number of coefficients is 50 or less.

14. The system of claim 8, wherein said encoding includes encoding at least a portion of said received data signal using a digital signal transform having a basis function being selected from one of a child and parent node on decomposition levels of said transform.

15. A computer-readable storage medium executable by a computer encoded with a computer program stored therein, the computer program when executed by a computer performing data compression, comprising:
- a) receiving a digital data signal;
- b) determining a true best basis (TBB) function to assign a best basis function for encoding the digital data signal;
- c) transforming digital data signal based on a wavelet-based transform coefficient at various decomposition levels to produce wavelet coefficients;
- d) determining the best basis function based on the wavelet coefficients; and
- e) encoding at least a portion of said received digital data signal using a signal transform said encoding being based on the best basis function satisfying a predetermined threshold.

16. The computer-readable storage medium of claim 15, wherein said determining the best basis function based on the wavelet coefficients further comprises performing the following steps:
- d1) sorting all wavelet coefficients from each decomposition level into a one dimensional vector, $V_s(n)$ with a length of $N*\log_2(N)$ where N is a sample length of the digital data signal;
- d2) selecting first sample coefficient $V_s(n)$ as a best vector of the best basis function where n is equal to 1;
- d3) generating a look-up-table (LUT) containing a non-orthogonal tree for a first best vector $V_s(\mathbf{1})$;
- d4) selecting $V_s(n+1)$ as a succeeding sample coefficient; and
- d5) determining the best basis function according to an orthogonality of the succeeding sample coefficient.

17. The computer-readable storage medium of claim 16, wherein said determining the best basis function according to the orthogonality of the succeeding sample coefficient further comprises performing the following steps:
if the succeeding sample coefficient $V_s(n+1)$ is orthogonal to $V_s(n)$, said determining step iteratively performing the following steps;
- d5-1) selecting the sample coefficient $V_s(n+1)$ as a succeeding best vector of the best basis function and storing to the LUT, the non-orthogonal tree for updated best vector;
- d5-2) if $n<N*\log_2(N)$, iterate steps (g)-(h) and n increment by 1 for each iteration; and
- d5-3) if n is not less than $N*\log_2(N)$, the updated sample succeeding sample coefficient $V_s(n+1)$ is determined as the best basis function.

18. The computer-readable storage medium of claim 17, wherein said determining the best basis function according to the orthogonality of the succeeding sample coefficient further comprises performing the following steps:
if the succeeding sample coefficient $V_s(n+1)$ is not orthogonal to $V_s(n)$, said determining step iteratively performing the following steps;
- d5-4) if $n<N*\log_2(N)$, repeat steps (g)-(h) with n increment by 1 for each iteration; and
- d5-5) if n is not less than $N*\log_2(N)$, the current sample succeeding sample coefficient $V_s(n+1)$ is determined as the best basis function.

19. The computer-readable storage medium of claim 15, wherein said predetermined threshold relates to one of number of errors in, number of coefficients for, amplitude of coefficients for, and computational complexity for reconstructing said at least a portion of the received digital data signal.

20. The computer-readable storage medium of claim 15, wherein said predetermined threshold relating to a number of coefficients is 50 or less.

21. The computer-readable storage medium of claim 15, wherein said encoding includes encoding at least a portion of said received data signal using a digital signal transform having a basis function being selected from one of a child and parent node on decomposition levels of said transform.

* * * * *